United States Patent [19]

Montelione

[11] Patent Number: 4,983,281

[45] Date of Patent: Jan. 8, 1991

[54] METAL DETECTOR SCOOP SIFTER

[76] Inventor: Joseph Montelione, 8531 NW. 21st Ct., Sunrise, Fla. 33322

[21] Appl. No.: 486,427

[22] Filed: Feb. 28, 1990

[51] Int. Cl.⁵ .............................................. B07B 1/00
[52] U.S. Cl. .................................... 209/418; 294/50.9; 324/329
[58] Field of Search ............................... 209/417–419, 209/235, 1, 614; 294/50.8, 50.9; 324/326–329, 262, 226; 37/137

[56] References Cited

U.S. PATENT DOCUMENTS

| | | | |
|---|---|---|---|
| 2,960,230 | 11/1960 | Fracker | 209/417 X |
| 3,916,298 | 10/1975 | Ulrich | 324/326 |
| 3,976,564 | 8/1976 | Holder | 209/417 X |
| 4,292,794 | 10/1981 | Gascon | 294/50.9 X |
| 4,359,686 | 11/1982 | Wherry | 209/38 X |

Primary Examiner—Donald T. Hajec
Attorney, Agent, or Firm—Alvin S. Blum

[57] ABSTRACT

A sifting scoop attaches to a metal detector. The scoop is movable relative to the detecting head to multiple operating positions. In a storage position the scoop is held on the shaft of the detector above the head where it will not interfere with the metal detecting operation. In a scooping position, the scoop is extended below the head for digging at a spot located by the detector. In an optional third or sifting position the scoop is held up close to the head to retain articles during sifting. The scoop walls are perforated to retain articles while discarding sand.

9 Claims, 1 Drawing Sheet

U.S. Patent    Jan. 8, 1991    4,983,281
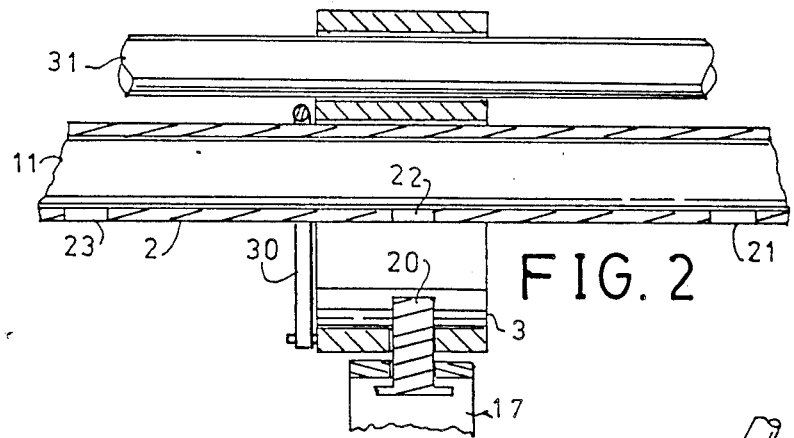
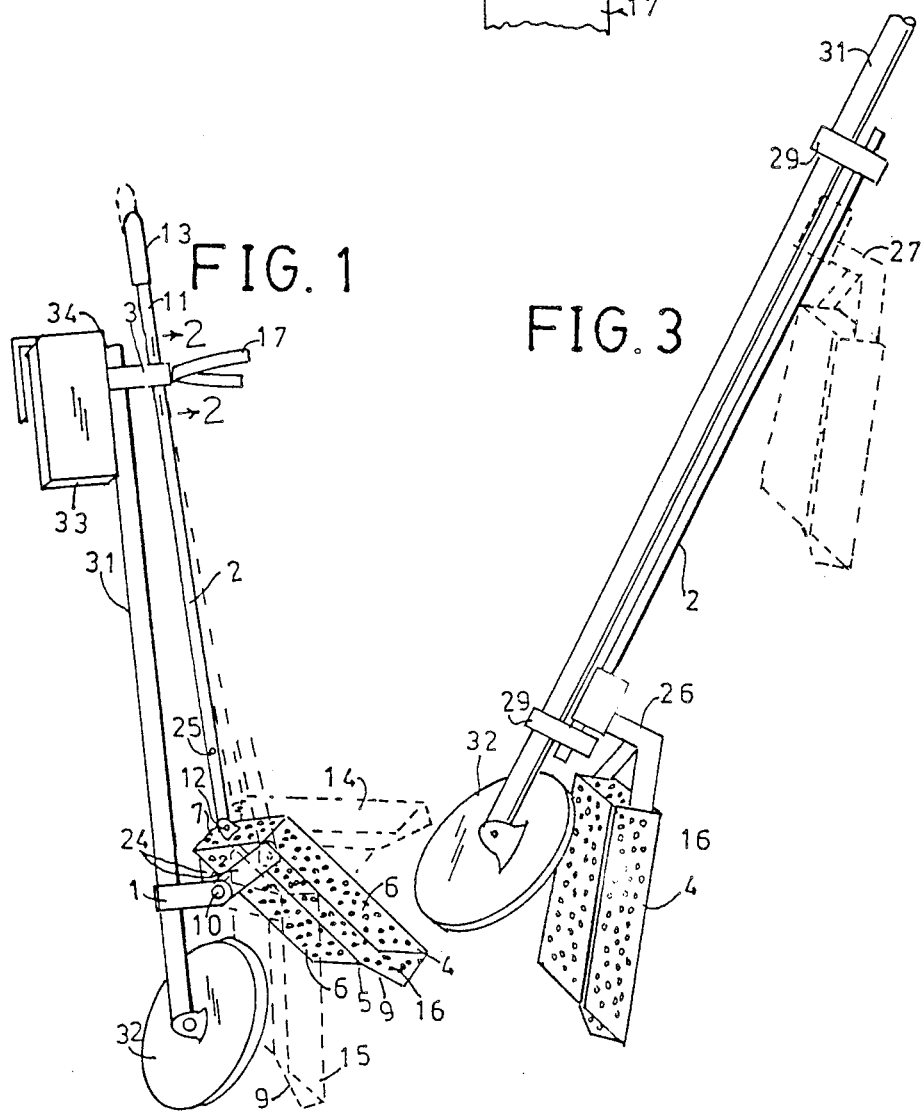

METAL DETECTOR SCOOP SIFTER

This invention relates to scoops and shovels and more specifically to a sand sifting scoop that attaches to the handle of a metal detector.

BACKGROUND OF THE INVENTION

Metal detectors generally consist of an elongate pole with a detecting head at one end and an electronic assembly at the other end. These are often used at sandy beaches to recover lost metal items buried beneath the surface. The user may carry along a sand scoop or shovel to dig through the sand at a location found by the detector. The scoop may be perforated to let sand pass through while retaining small metal items such as coins. The operator generally needs both hands to use the scoop. The detector must be laid aside in the sand. It is awkward to carry and use the scoop and the detector together, and if the scoop comes near the detector, it will give an erroneous reading.

SUMMARY OF THE INVENTION

It is accordingly an object of the invention to provide a scoop sifter that can be used in combination with a metal detector without requiring the operator to carry two separate items. It is a further object that the scoop sifter be attachable to the metal detector in such fashion that it does not interfere with the normal operation of the detector while enabling the operator to deploy the scoop for use with a simple manipulation.

The scoop sifter of the invention comprises a perforated scoop for scooping and sifting. The scoop is attached to the shaft of a metal detector. Means are provided for maintaining at least two positions of the scoop relative to the detector, a stored position where the scoop is removed from the vicinity of the head and a deployed position where the scoop is extended below the head so that the entire assembly serves as a long-handled scoop for digging without excessive bending.

These and other objects, features and advantages of the invention will become apparent when the detailed description is considered in conjunction with the drawings.

BRIEF DESCRIPTION OF THE DRAWINGS

FIG. 1 is a perspective view of the scoop attached to a metal detector.

FIG. 2 is a cross section view, taken through line 2—2 of FIG. 1, greatly enlarged.

FIG. 3 is a perspective view of an alternative embodiment of the invention attached to a metal detector.

DETAILED DESCRIPTION OF THE PREFERRED EMBODIMENTS

Referring first to FIGS. 1 and 2, a conventional metal detector 34 includes a metal shaft 31 with a detecting head 32 at one end and an electronics assembly 33 at a second end. When metal is close to the detector head, the electronic assembly responds with an audible and visible signal. The scoop sifter 2 of the invention is removably clamped to the shaft 31 with first clamp 1 and second clamp 3. The scoop portion 4 is a perforated device with an open top 5, closed sides 6 and back 7 and an open front 9 which is pushed into the sand in an ordinary shoveling motion. The scoop portion 4 is pivotally connected by connector 24 to clamp 1 and rotates about pivot pin 10 when pulled or pushed by control lever 11 which is pivotally attached at pivot 12 to the scoop portion. The scoop portion 4 is shown in the scooping or shoveling position spaced apart from the detecting head 32. Handle 13 on control lever 11 is a convenient hand grip when shoveling. Shown in phantom are two other positions into which the scoop portion 4 may be rotated and locked by movement of the control lever 11.

In position 14, the scoop portion is stored out of the way while the detecting head 32 is moved about while searching for metal. In position 15, the scoop portion is moved forward to the sifting position to better retain material while agitating the contents to cause the sand to fall through the perforations 16. The scoop portion is preferably made of stainless steel. When the scoop portion 4 is close to the detecting head 32, the detector will respond audibly if the scoop portion is made of metal. The scoop portion may be made of an engineering plastic such as polycarbonate to overcome this effect that may be annoying to some people.

Support legs 17 may be optionally provided to hold the electronics assembly 33 above the sand when the detector is laid down. As best seen in FIG. 2, the second clamp 3 has an elongate cavity 19 with a locking pin 20 protruding into the bottom of the cavity. Holes 21, 22 and 23 in control lever 11 are arranged to engage the locking pin 20 when the lever is lowered, and to disengage the pin when the lever is lifted. Hole 21 locks the scoop in the sift position. Hole 22 locks the scoop in the shovel position and hole 23 locks the scoop in store position. The scoop and control lever may be removed from the metal detector and used as a separate scoop sifter by withdrawing pivot pin 10 from clamp 1 and pinning connector 24 to control lever 11 at hole 25.

An alternative embodiment of the invention is shown in FIG. 3 in which the scoop sifter is clamped by clamps 29 to the detector and is provided with a slide mounting so that the operator can slide the scoop portion 4 between a shovel position 26 and a storage position 27 (shown in phantom).

Optionally, elasticized cord or spring 30, encircling control lever 11 may be provided to hold the lever against the locking pin 20 (FIG. 2).

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. An apparatus including a sifting scoop in combination with a metal detector of the type having an elongate shaft with a detecting head at a first end and an electronic assembly at a second end, the apparatus comprising:

(a) said sifting scoop including a scoop means for scooping material, said scoop means having an open top and front and walls having perforations for passing fine materials and retaining larger material during a sifting operation;

(b) multiple-position support means for selectively supporting said scoop means in a plurality of positions, said positions including a first, scooping position in which said support means holds said scoop means extended down below said detecting head for scooping without interference from said head, and a second, storage position in which said support means holds said scoop means alongside said shaft between said head and said electronic assembly where it will not interfere with use of said head during a metal detecting operation; and (c) attaching means for removably attaching said support means directly to said metal detector.

2. The apparatus according to claim 1 in which said support means comprises:

(d) a first connector element pivotally connecting said scoop means and a first clamp member;

(e) an elongate control member having a first end pivotally connected to said scoop means; and (f) locking means operatively connected between said control member and a second clamp member for selectively locking said scoop means in said positions relative to said detecting head.

3. The apparatus according to claim 1 in which said positions includes a third, sifting position whereby said scoop means is extended forward and close to said detecting head whereby the orientation of said scoop means relative to said detecting head is effective to retain objects during the sifting operation.

4. The apparatus of claim 1 in which said support means includes support legs for elevating said electronic assembly when said apparatus is resting on a surface.

5. The apparatus according to claim 2 in which said support means includes means for fixing said scoop means rigidly to said elongate control member.

6. The apparatus according to claim 2 in which said control member has a handle at a second end.

7. The apparatus according to claim 2 in which said locking means includes an extension on said second clamp member having an aperture through which passes said control member; a locking pin attached to said extension and extending into said aperture and a plurality of transverse holes in said control member for selective engagement with said locking pin.

8. The apparatus of claim 1 in which said support means comprises sliding connecting means slideably attached to said scoop means for selectively sliding said scoop means relative to said detecting head between said positions.

9. The apparatus of claim 1 in which said scoop means is fabricated of plastic to reduce interference with said detecting head.

* * * * *